May 1, 1951 B. H. FULLER 2,550,799
VIEWING DEVICE
Filed Nov. 25, 1944
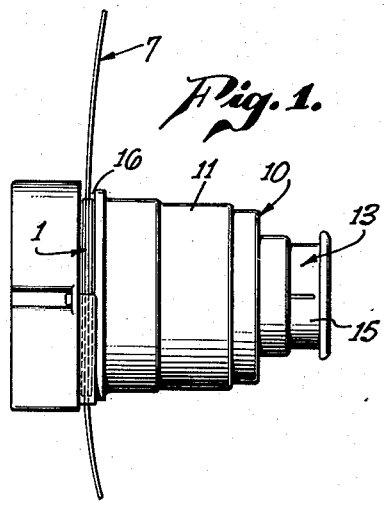
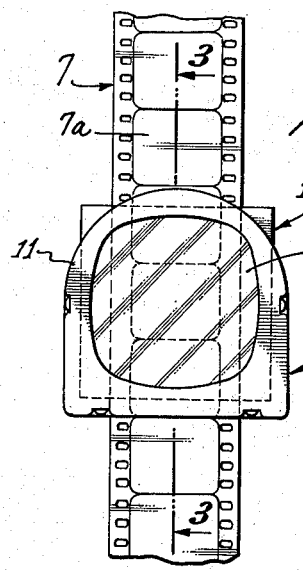
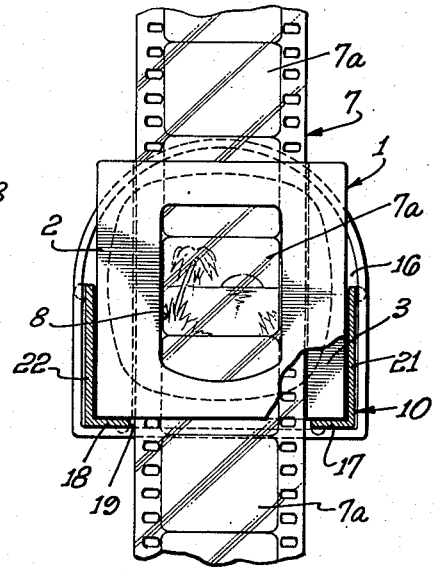
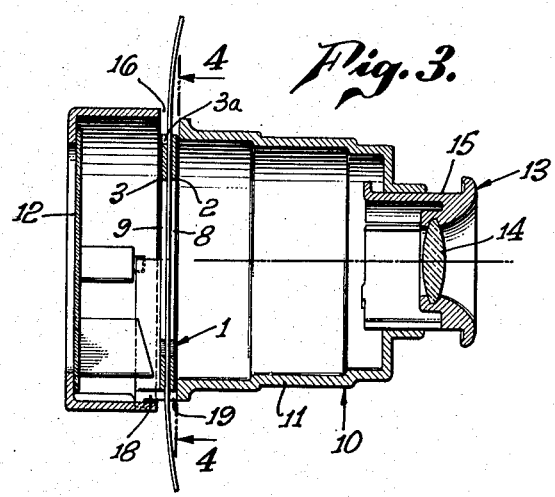
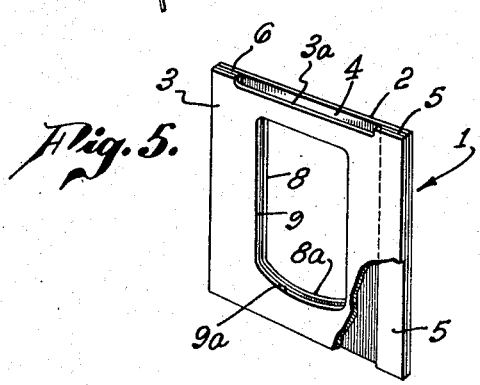
Boyd H. Fuller,
INVENTOR.
BY
ATTORNEY.

Patented May 1, 1951

2,550,799

UNITED STATES PATENT OFFICE 2,550,799

VIEWING DEVICE

Boyd H. Fuller, Los Angeles, Calif.

Application November 25, 1944, Serial No. 565,093

8 Claims. (Cl. 40—28)

This invention relates to apparatus for viewing motion picture film, Kodachrome slides or the like, and particularly to a holder for such film while it is being viewed.

It is frequently desirable to view individual frames of a motion picture film as "stills," such as for inspection, or entertainment, or other purposes. It is an object of this invention to provide an improved holder for motion picture film to facilitate such viewing.

It is another object of this invention to provide a viewing device which is adapted optionally for viewing either a mounted transparency or slide, or strip film.

In the viewing of such film or in viewing Kodachrome or other slides, some degree of magnification is necessary, or at least desirable. It is thus another object of this invention to provide a viewing device capable of use optionally with either a strip of film or slides, which provides substantial magnification.

In viewing transparencies such as strip film, slides or the like by refracted light, it is necessary that the light be of adequate intensity, and at the same time quite uniformly diffused over the area of the transparency. It is thus another object of this invention to provide a viewing device capable of use optionally with either a strip of film or slides, which insures uniformly diffused light for illuminating the transparency.

It is still another object of this invention to provide a holder for motion picture film which retains the strip of film against undesired movement, which permits the strip to readily be inserted or removed, or adjusted to position a desired portion thereof for viewing or inspection, and which is simple and economical to manufacture.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawing:

Figure 1 is a side elevation of the viewing apparatus incorporating the features of the invention with a film in place;

Figure 2 is an elevation from the left of Figure 1;

Figure 3 is a vertical section on an enlarged scale taken on line 3—3 of Figure 2;

Figure 4 is a cross section taken on line 4—4 of Figure 3; and

Figure 5 is a pictorial view of the film holder.

Referring to the drawing, the film holder is indicated by 1 and includes a pair of similar members 2 and 3 which are secured together in spaced relationship to provide a through channel 4, for example by a pair of spacer strips 5 and 6. The channel 4 freely accommodates the film 7 for movement lengthwise of the film, the thickness of the strips 5 and 6 being such as to cause the marginal edges of the film strip to be frictionally gripped between the members 2 and 3, due to the flexibility and inherent tendency of the film to curl. This prevents the film from falling through the channel 4, but at the same time allows the strip to be pulled easily through the channel by the hand of the person doing the viewing. Although the drawing shows a holder for accommodating 35 mm. film, the size of the holder could be readily varied to accommodate film of different sizes, such as 8 mm. and 16 mm. The width of the space 4 provides only slight clearance at the edges of the film 7, the spacers 5 and 6 serving thus quite accurately to position the film 7 laterally in the holder.

The members 2 and 3 are provided with apertures 8 and 9 which are in substantial alignment when the members are in assembled relationship. The width of the apertures 8 and 9 is substantially equal to the width of the picture frames 7—a on the film 7, as clearly shown in Figure 4. Since, as just pointed out, the film is accurately positioned by the spacers or side members 5 and 6, the picture frames will be accurately aligned along their edges with the sides of the apertures 8 and 9. Thus, the unsightly edge portions of the film carrying the usual perforations and sound track are hidden when viewing the film. At the same time, the length of the apertures 8 and 9 is substantially greater than the dimension of a picture frame lengthwise of the film to avoid the necessity of accurately positioning the film to view any chosen frame.

It is intended that the film 7 be inserted in the channel 4 from the top, as viewed in the drawing. To facilitate such insertion or threading of the film, one of the members, as 3 (Figures 3 and 5) is provided with a recess or cut out portion 3—a which extends the full distance between the spacers 5 and 6. In this way the end of the film 7 can be easily placed against the other member 2 and between the spacers 5 and 6 so that it is in line with the channel 4. The film is then readily inserted in the channel by downward movement of the film with respect to the holder.

To prevent the advancing edge of the film 7 catching on the facing edges 8—a and 9—a of the apertures 8 and 9, these edges are inclined to the direction of movement of the film. For instance, they may be arcuate as shown in Figures 4 and 5. By this means a wedging action is produced on the advancing edge of the film 7, which flattens the film so that it readily passes the edges 8—a and 9—a.

It is preferable to view the film against a translucent background and with some degree of magnification. For this purpose, the film holder 1 may be used with a viewing device 10 such as shown in Figures 1 to 4. This device 10, as clearly shown in Figures 3 and 4, comprises a body 11 supporting a translucent screen 12 at one end and a magnifying eye piece 13 adjacent the other end. This eye piece 13 comprises a lens 14, secured in a tube 15 slideably mounted in the body 11 for focusing the lens with respect to the film. The body 11 is partially intersected by a slot 16 intermediate the screen 12 and eye piece 13 for receiving the film holder 1, which is supported on the bottom of the body 11 by the shoulders 17, 18. These shoulders 17 and 18 are separated by a space 19, which forms a slot aligned with the slot 16 to accommodate that portion of the film 7 extending below the film holder 1. This portion may be grasped by the hand of the person using the viewing and the film pulled downwardly through the viewer, or the film may be pulled upwardly by grasping that portion of the film above the holder. In this way the film may be adjusted readily to bring a desired portion into viewing position. The body 11 also has side walls 21 and 22 which engage respectively the opposite edges of the holder 1 to position the holder 1 laterally in the body and in transverse alignment with the axis of the lens 14. In this way it is possible to use a powerful lens 14 and maintain the distortion at the sides of the frame being viewed within tolerable limits. The film 7 may of course be adjusted longitudinally to bring the desired portion into proper viewing position.

It will be obvious that similar film holders 1 having the same outside dimensions and adapted for use with the viewing device 10, but having channels 4 and apertures 8 and 9 of different widths to accommodate other sizes of film 7, may be provided. For example, film holders may be provided for 8 mm. and 16 mm. film.

I claim:

1. A holder for strip film having at least one picture frame thereon, comprising spaced front and back members between which the film is adapted to be confined against movement transversely of the strip, said members being so spaced that said strip is freely movable lengthwise therebetween for insertion and removal, there being aligned viewing apertures respectively in said members, each having a width substantially equal to the width of said picture frame, a corresponding end of each aperture being inclined transversely of the length of the strip to facilitate threading the strip through the holder from the opposite end.

2. A holder for strip film having at least one picture frame thereon, comprising a pair of members between which the film is adapted to be slideably accommodated for movement lengthwise of the film, said members being so spaced that said strip is freely movable lengthwise therebetween for insertion and removal, there being aligned viewing apertures respectively in said members, means positioning the film transversely between the members, means providing a recess at the edge of one member, said recess being substantially the width of the film and extending below the edge of the other member to facilitate insertion of the film between the members.

3. A holder for strip film having at least one picture frame thereon, comprising a pair of members, means securing said members in spaced relation to form a through channel for slidingly accommodating the film for movement lengthwise of the strip, said means by engagement with the edges of the film confining the film against lateral movement between the members, there being aligned viewing apertures in said members of a width substantially equal to that of the picture frame, a corresponding end of each aperture being inclined transversely of the length of the strip, one of said members having a recess at that end of the member remote from said inclined edge and extending between said securing means to facilitate threading of the film between the members.

4. In apparatus for viewing a transparency, means forming a body supporting a translucent screen and a viewing lens spaced therefrom, a film holder for slidingly supporting a strip of film, said film being adapted to extend below the holder, means forming a slot in said body open at the top and intermediate said screen and said lens for receiving the holder, and means on the body beneath the lower end of the holder for supporting said holder in the body, there being a slot in the bottom of the body substantially aligned with the first mentioned slot for accommodating the film.

5. In apparatus for viewing a transparency, means forming a body supporting a translucent screen and a viewing lens spaced therefrom, a film holder for slidingly supporting a strip of film having a picture frame thereon, said holder having means for positioning said film laterally in the holder, means for supporting said holder in said body, comprising portions on said body extending beneath the lower edge of said holder, and means for positioning the holder laterally so that said frame is aligned laterally with the axis of said lens.

6. In apparatus for viewing a transparency, means forming a body supporting a translucent screen and a viewing lens spaced therefrom, a film holder for slidingly supporting a strip of film having a picture frame thereon, said holder having means for positioning said film laterally in the holder, said film extending optionally above as well as below the holder, means for supporting said holder in said body comprising a pair of spaced shoulders extending laterally inwardly beneath the lower edge of said holder, and means for positioning the holder laterally to align the picture frame with the lens axis in a lateral direction, the space between the shoulders serving to accommodate that portion of the film below the holder.

7. In a device for viewing a transparency mounted in a holder, a body, a translucent screen on said body, a viewing lens on the body directed toward the screen and spaced therefrom, and means on the body extending beneath said holder for supporting the holder to position the transparency between the screen and the lens, said support means having a slot extending transversely of the axis of said lens to accommodate a transparency comprising strip film.

8. In a device for viewing a transparency mounted in a holder, a body, a translucent screen on said body, a viewing lens on the body directed toward the screen and spaced therefrom, and means on the body for supporting the holder to position the transparency between the screen and the lens, comprising a pair of spaced shoulders, the space between the shoulders adapting the body to accommodate a transparency comprising strip film.

BOYD H. FULLER.

REFERENCES CITED

The following references are of record in the file of this patent:

UNITED STATES PATENTS

| Number | Name | Date |
|---|---|---|
| 756,301 | Waid | Apr. 5, 1904 |
| 1,018,230 | Battershall et al. | Feb. 20, 1912 |
| 1,595,997 | Cocanari | Aug. 17, 1926 |
| 1,785,866 | Heune | Dec. 23, 1930 |
| 2,239,032 | Boch | Apr. 22, 1941 |

FOREIGN PATENTS

| Number | Country | Date |
|---|---|---|
| 353,278 | Great Britain | July 23, 1931 |